US012803026B2

(12) United States Patent
Chen et al.

(10) Patent No.: US 12,803,026 B2
(45) Date of Patent: Nov. 17, 2026

(54) METHOD AND SYSTEM FOR ACCELERATED LIFE TESTING (ALT) OF PROTON EXCHANGE MEMBRANE FUEL CELLS (PEMFCs)

(71) Applicant: Wuhan University of Technology, Wuhan (CN)

(72) Inventors: Qihong Chen, Wuhan (CN); Haolong Li, Wuhan (CN); Liang Xie, Wuhan (CN); Liyan Zhang, Wuhan (CN); Peng Xiao, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 390 days.

(21) Appl. No.: 18/613,869

(22) Filed: Mar. 22, 2024

(65) Prior Publication Data

US 2025/0087733 A1 Mar. 13, 2025

(30) Foreign Application Priority Data

Sep. 7, 2023 (CN) ........................ 202311154741.0

(51) Int. Cl.

*H01M 8/04992* (2016.01)
*H01M 8/04298* (2016.01)
*H01M 8/04537* (2016.01)
*H01M 8/04664* (2016.01)

(52) U.S. Cl.

CPC ... *H01M 8/04992* (2013.01); *H01M 8/04305* (2013.01); *H01M 8/04552* (2013.01); *H01M 8/04671* (2013.01)

(58) Field of Classification Search

CPC ......... H01M 8/04992; H01M 8/04305; H01M 8/04552; H01M 8/04671; Y02E 60/50; G06F 18/15; G06F 17/16; G06F 18/214; G06F 18/217; G01R 31/367;

(Continued)

(56) References Cited

U.S. PATENT DOCUMENTS 11,811,116 B1 * 11/2023 Dong ................ H01M 8/04664

FOREIGN PATENT DOCUMENTS

| | | | | |
|---|---|---|---|---|
| CN | 104133369 | * | 11/2014 | ............. G05B 13/04 |
| CN | 112732797 | * | 4/2021 | ......... G06F 18/2431 |
| CN | 114814589 | * | 7/2022 | ........... G01R 31/367 |

* cited by examiner

*Primary Examiner* — Alexander Satanovsky

(57) ABSTRACT

Provided is a method and a system for accelerated life testing (ALT) of a proton exchange membrane fuel cell (PEMFC). In the present disclosure, a collected voltage-time sequence data of the PEMFC is filtered and subjected to empirical mode decomposition (EMD), such that a voltage data is decomposed to obtain K intrinsic mode functions. A constructed bidirectional long short-term memory-based artificial neural network (BiLSTM) shows majority input characteristics and can model each of the intrinsic mode functions independently, thereby reducing a difficulty of long-cycle life prediction in limited training data scenarios. In addition, optimal parameters of the BiLSTM are optimized through a sparrow search algorithm, which greatly improves a prediction accuracy of a remaining useful life for the PEMFC. The method and the system of the present disclosure exhibit low computing cost, simple parameter setting, and high prediction accuracy, and are extremely suitable for operation and maintenance of the PEMFC.

20 Claims, 3 Drawing Sheets

(58) Field of Classification Search
CPC .. G01R 31/378; G01R 31/385; G01R 31/392; G06N 3/006; G06N 3/0442; G06N 3/045; G06N 3/084
See application file for complete search history.

METHOD AND SYSTEM FOR ACCELERATED LIFE TESTING (ALT) OF PROTON EXCHANGE MEMBRANE FUEL CELLS (PEMFCs)

CROSS REFERENCE TO RELATED APPLICATION

This patent application claims the benefit and priority of Chinese Patent Application No. 2023111547410, filed with the China National Intellectual Property Administration on Sep. 7, 2023, the disclosure of which is incorporated by reference herein in its entirety as part of the present application.

TECHNICAL FIELD

The present disclosure belongs to the technical field of proton exchange membrane fuel cells (PEMFCs), and relates to a method and a system for accelerated life testing (ALT) of a PEMFC.

BACKGROUND

In recent years, energy issues have been an important topic for discussion for environmental protection and development. On one hand, fossil energy reserves are limited and non-renewable; on the other hand, there is an increasing consumption of industrial and domestic energy. Proton exchange membrane fuel cells (PEMFCs), as one of the most promising and popular new energy technologies at present, have many advantages such as no pollution, high energy conversion rate, simple mechanical structure, stable operation, and low noise.

Since the PEMFC adopts an in-series structure design, the performance degradation of a single cell in the stack may cause a decreased power generation efficiency of the entire stack. This leads to voltage degradation in the PEMFC system, resulting in temporary or permanent PEMFC degradation. Direct testing of fuel cells can fail the fuel cell stack. During long-term operation of fuel cells, especially under complex dynamic conditions, stress-strain differences and gas starvation caused by dynamic moisture and heat changes may lead to PEMFC performance attenuation and voltage drop. The material failure of a proton exchange membrane (PEM) is irreversible, that is, a PEMFC system cannot be restored by adjusting operating parameters and control strategies, leading to permanent damages to the PEMFC to cause irreparable economic losses. Therefore, it is critical to continued operation by ensuring that the PEMFC system is in a healthy state. While maintaining a safe and reliable operation of the PEMFC system, real-time prediction of a remaining useful life of the PEMFC based on system operating parameters can shut down the system for maintenance before the stack is scrapped, thereby minimizing maintenance time and extending safe useful life.

Existing data-based methods require a large amount of training data to learn the aging trend of PEMFC and cannot accurately predict the remaining useful life of PEMFC with limited data. Furthermore, the parameters of existing data-driven algorithms are mostly set based on experience. The testing algorithm is prone to overfitting under limited data, while manual adjustment of parameters is time-consuming and has a poor adaptability, resulting in low prediction accuracy of the prediction algorithm. The operating data of fuel cells are nonlinear and multidimensional and contain important degradation information of the fuel cells. Remaining useful life prediction methods show weak feature extraction capabilities in limited data sets and are difficult to improve the overall prediction accuracy.

SUMMARY

In order to solve the problems described in the background, the present disclosure provides a method and a system for ALT of a PEMFC.

The method provided by the present disclosure includes the following steps:

step 1, conducting data collection and processing: collecting a voltage-time sequence data of the PEMFC through a sensor to allow Gaussian filtering to filter out noise and abnormal peaks to obtain a processed voltage-time sequence data; subjecting the processed voltage-time sequence data to empirical mode decomposition (EMD), such that a voltage data is decomposed to obtain K intrinsic mode functions, where K is an integer of greater than or equal to 1; and dividing the K intrinsic mode functions into a training data set and a test data set according to a ratio of user demand, and normalizing the training data set and normalizing the test data set based on a normalization standard of the training data set to smoothly map into [0,1];

step 2, constructing a bidirectional long short-term memory-based artificial neural network (BiLSTM), where the BiLSTM includes an input layer, a hidden layer, and an output layer, a number of input eigenvalues of the BiLSTM is determined according to a number of the intrinsic mode functions, and a matrix and a vector of the BILSTM are initialized to 0;

step 3, training the BiLSTM: subjecting the BILSTM to network training based on an input data, selecting t time steps as a prediction interval, and using a data before each of the t time steps as an input training data at a current moment; selecting a root mean square error as an error function, calculating a gradient of each weight according to a corresponding error term using an adaptive matrix estimation algorithm as an optimizer when an error is greater than a default threshold, where the error term is propagated in a reverse direction along time and the weight is updated through stochastic gradient descent; conducting gradient evaluation, where if a gradient accuracy meets a stopping criterion, a corresponding value of the gradient accuracy is output as a prediction result; if the gradient accuracy does not meet the stopping criterion, the gradient is re-updated;

step 4, generating an initial sample point $X_i$ with an initial learning rate, a number of iterations, and a number of neurons in the hidden layer according to a range of model parameters, inputting the initial sample point $X_i$ into a sparrow search algorithm to allow automatic optimization on network parameters of the BiLSTM including the initial learning rate, the number of iterations, and the number of the neurons in the hidden layer, and then outputting optimal network parameters to obtain a trained and optimized BiLSTM; inputting the test data set into the trained and optimized BILSTM to allow testing to determine whether a newly selected sample point meets a model accuracy requirement; where if the newly selected sample point meets the model accuracy requirement, the testing is terminated through a termination algorithm to output an optimal BiLSTM; if the newly selected sample point does not meet the model accuracy requirement, whether the automatic optimization reaches a maximum number of iterations is determined; if the automatic optimization reaches the maximum number of iterations, the optimal BILSTM is output, otherwise the sparrow search algorithm is iterated in a loop until the newly selected sample point meets the model accuracy requirement; and step 5, applying the optimal BILSTM to the ALT of the PEMFC, denormalizing an obtained prediction result, and converting a resulting predicted remaining useful life data into a remaining useful life-time sequence data through the output layer.

Further, the Gaussian filtering in step 1 has a formula as follows:

$$K(t) = \frac{\exp(-t^2/2)}{\sqrt{2\pi}},$$

$$f(t_j) = \sum_{i=1}^{n} s_i \cdot u(t_j) / \sum_{i=1}^{n} s_i,$$

$$s_i = K[(t_j - t_i)]/H,$$

in the formula, K(t) represents standard normal distribution of a parameter data at time t, $f(t_j)$ represents a filtered data, $u(t_j)$ represents the parameter data, n represents a number of the parameter data, and H represents a bandwidth.

Further, a process of decomposing the voltage data in step 1 specifically includes: smoothing the voltage data through the EMD, where the K intrinsic mode functions include local characteristic signals at different time scales of an original signal, respectively; and Further, the input layer in step 2 has a calculation formula as follows:

$$i_t = \sigma(W_i \cdot [h_{t-1}, x_t] + b_i),$$

$$o_t = \sigma(W_o \cdot [h_{t-1}, x_t] + b_o),$$

$$f_t = \sigma(W_f \cdot [h_{t-1}, x_t] + b_f),$$

in the formula: $i_t$, $W_t$, and $b_t$ represent a calculation result, a weight matrix, and a bias term of the input layer, respectively; $O_t$, $W_o$, and $b_o$ represent a calculation result, a weight matrix, and a bias term of the output layer, respectively; $f_t$, $W_f$, and $b_f$ represent a calculation result, a weight matrix, and a bias term of a forget gate, respectively; $h_{t-1}$ represents a next value of the hidden layer at time t−1, $x_t$ represents input information, and σ represents a sigmoid activation function; and a value of memory information output by the output layer at time t is $c_t$, a next value of memory information output by the output layer at time t−1 is $c_{t-1}$, a value of the hidden layer at time t is $h_t$, and the next value of the hidden layer at time t−1 is $h_{t-1}$, where formulas are as follows:

$$\tilde{c}_t = \tanh(W_c \cdot [h_{t-1}, x_t] + b_c)$$

$$c_t = f_t \cdot c_{t-1} + i_t \cdot \tilde{c}_t$$

$$h_t = o_t \cdot \tanh(c_t),$$

in the formula: $\tilde{c}_t$ represents a candidate state of a memory unit at time t; tanh represents a hyperbolic tangent activation function; $W_c$ represents a weight matrix of an input unit; $x_t$ represents the input information; $b_c$ represents a bias term of an input unit state; and · represents element-wise multiplication.

Further, the adaptive matrix estimation algorithm in step 3 specifically includes:

(1) randomly initializing all weights in the BILSTM;

(2) setting initial parameters of a first-order moment, a second-order moment, a global learning rate, and an attenuation coefficient;

(3) calculating a current gradient through a loss function;

(4) calculating the time steps;

(5) updating an accumulated gradient with the current gradient to allow first-order moment estimation;

(6) updating a square of the accumulated gradient with the current gradient to allow second-order moment estimation;

(7) subjecting the first-order moment and the second-order moment to deviation correction;

(8) calculating an update amount of the all weights in the BiLSTM through corrected first-order moment and second-order moment;

(9) updating the all weights of parameters in the BiLSTM; and

(10) repeating steps (3) to (9) to allow iteration, terminating the iteration when a maximum number of iterations for termination is achieved, and outputting current parameters in the BiLSTM.

Furthermore, the automatic optimization on the network parameters in step 3 specifically includes:

randomly initializing a position of a sparrow population, setting a producer ratio and an optimization dimension, setting a position update mode of a discoverer at different warning values and calculating a fitness value, setting a position update mode of a follower with different fitness values, obtaining a final position as an optimal solution, and outputting the optimal solution to obtain the optimal network parameters, thereby obtaining the trained and optimized BiLSTM.

The present disclosure further provides a system for ALT of a PEMFC, including a data acquisition and processing module, a neural network (NN) construction module, an NN training module, an NN optimization module, and an NN application module; where the data acquisition and processing module is configured to conduct: collecting a voltage-time sequence data of the PEMFC through a sensor to allow Gaussian filtering to filter out noise and abnormal peaks to obtain a processed voltage-time sequence data; subjecting the processed voltage-time sequence data to EMD, such that a voltage data is decomposed to obtain K intrinsic mode functions, where K is an integer of greater than or equal to 1; and dividing the K intrinsic mode functions into a training data set and a test data set according to a ratio of user demand, and normalizing the training data set and normalizing the test data set based on a normalization standard of the training data set to smoothly map into [0,1];

the NN construction module is configured to conduct: constructing a BiLSTM, where the BiLSTM includes an input layer, a hidden layer, and an output layer, a number of input eigenvalues of the BiLSTM is determined according to a number of the intrinsic mode functions, and a matrix and a vector of the BiLSTM are initialized to 0;

the NN training module is configured to conduct: subjecting the BILSTM to network training based on an input data, selecting t time steps as a prediction interval, and using a data before each of the t time steps as an input training data at a current moment; selecting a root mean square error as an error function, calculating a gradient of each weight according to a corresponding error term using an adaptive matrix estimation algorithm as an optimizer when an error is greater than a default threshold, where the error term is propagated in a reverse direction along time and the weight is updated through stochastic gradient descent; conducting gradient evaluation, where if a gradient accuracy meets a stopping criterion, a corresponding value of the gradient accuracy is output as a prediction result; if the gradient accuracy does not meet the stopping criterion, the gradient is re-updated;

the NN optimization module is configured to conduct: generating an initial sample point $X_i$ with an initial learning rate, a number of iterations, and a number of neurons in the hidden layer according to a range of model parameters, inputting the initial sample point $X_i$ into a sparrow search algorithm to allow automatic optimization on network parameters of the BiLSTM including the initial learning rate, the number of iterations, and the number of the neurons in the hidden layer, and then outputting optimal network parameters to obtain a trained and optimized BiLSTM; inputting the test data set into the trained and optimized BILSTM to allow testing to determine whether a newly selected sample point meets a model accuracy requirement; where if the newly selected sample point meets the model accuracy requirement, the testing is terminated through a termination algorithm to output an optimal BILSTM; if the newly selected sample point does not meet the model accuracy requirement, whether the automatic optimization reaches a maximum number of iterations is determined; if the automatic optimization reaches the maximum number of iterations, the optimal BiLSTM is output, otherwise the sparrow search algorithm is iterated in a loop until the newly selected sample point meets the model accuracy requirement; and the NN application module is configured to conduct: applying the optimal BILSTM to the ALT of the PEMFC, denormalizing an obtained prediction result, and converting a resulting predicted remaining useful life data into a remaining useful life-time sequence data through the output layer.

The present disclosure further provides a computer device for ALT of a PEMFC, including a memory, a processor, and a program instruction stored in the memory to allow execution by the processor, where the processor executes the program instruction to implement the steps of the method and to run the system.

The present disclosure further provides a computer-readable storage medium storing a computer program, where the computer program, when executed by a processor, implements the steps in the method and runs the system.

Compared with the existing technology, the present disclosure has the following technical advantages: the collected voltage-time sequence data of PEMFC is processed to allow EMD, such that the voltage data is decomposed to obtain K intrinsic mode functions. The constructed BILSTM can independently predict local characteristic signals in the K intrinsic mode functions, achieving an effect of non-interference and reducing a difficulty in prediction. In addition, through training, optimization, and testing of the BiLSTM, an optimal BiLSTM can be obtained, to greatly improve a prediction accuracy of the remaining useful life for PEMFC. The method and the system of the present disclosure exhibit low computing cost, simple parameter setting, and high prediction accuracy, and are extremely suitable for operation and maintenance of the PEMFC.

DETAILED DESCRIPTION OF THE EMBODIMENTS

To make the to-be-resolved technical problems, technical solutions and beneficial effects of the present application clearer, the present application is described in further detail below with reference to the drawings and embodiments. It should be understood that the specific embodiments described herein are merely intended to explain the present application, rather than to limit the present application.

Figure 1:
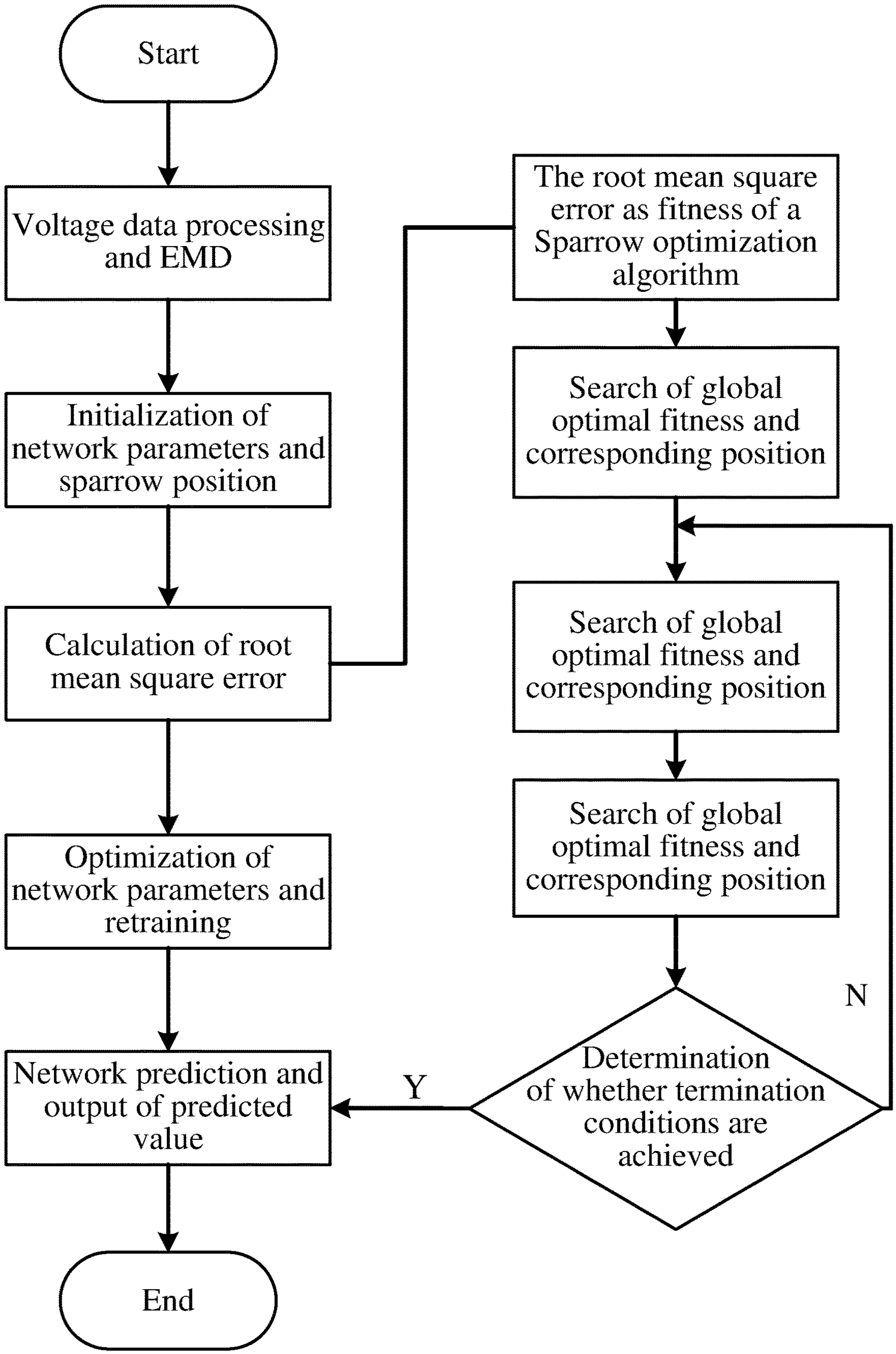
FIG. 1 shows a flowchart of the method in the present disclosure.

A method for ALT of a PEMFC, as shown in FIG. 1, includes the following steps:

step 1, conducting data collection and processing:

collecting a voltage-time sequence data of the PEMFC through a sensor to allow Gaussian filtering to filter out noise and abnormal peaks to obtain a processed voltage-time sequence data; subjecting the processed voltage-time sequence data to EMD, such that a voltage data is decomposed to obtain K intrinsic mode functions, where K is an integer of greater than or equal to 1; and dividing the K intrinsic mode functions into a training data set and a test data set according to a ratio, and normalizing the training data set and normalizing the test data set based on a normalization standard of the training data set to smoothly map into [0,1];

Specifically, the Gaussian filtering has a formula as follows:

$$K(t)=\frac{\exp(-t^2/2)}{\sqrt{2\pi}},$$

$$f(t_j)=\sum_{i=1}^{n}s_i\cdot u(t_j)/\sum_{i=1}^{n}s_i,$$

$$s_i=K[(t_j-t_i)]/H,$$

in the formula, K(t) represents standard normal distribution of a parameter data at time t, $f(t_j)$ represents a filtered data, $u(t_j)$ represents the parameter data, n represents a number of the parameter data, and H represents a bandwidth.

A process of decomposing the voltage data specifically includes: smoothing the voltage data through the EMD, where the K intrinsic mode functions include local characteristic signals at different time scales of an original signal, respectively; and step 2, constructing a BiLSTM:

where the BiLSTM includes an input layer, a hidden layer, and an output layer, a number of input eigenvalues of the BiLSTM is determined according to a number of the intrinsic mode functions, and a matrix and a vector of the BILSTM are initialized to 0;

Specifically, the input layer has a calculation formula as follows:

$$i_t = \sigma(W_i \cdot [h_{t-1}, x_t] + b_i),$$

$$o_t = \sigma(W_o \cdot [h_{t-1}, x_t] + b_o),$$

$$f_t = \sigma(W_f \cdot [h_{t-1}, x_t] + b_f),$$

in the formula: $i_t$, $W_t$, and $b_t$ represent a calculation result, a weight matrix, and a bias term of the input layer, respectively; $O_t$, $W_o$, and $b_o$ represent a calculation result, a weight matrix, and a bias term of the output layer, respectively; $f_t$, $W_f$, and $b_f$ represent a calculation result, a weight matrix, and a bias term of a forget gate, respectively; $h_{t-1}$ represents a next value of the hidden layer at time t−1, $x_t$ represents input information, and σ represents a sigmoid activation function; and a value of memory information output by the output layer at time t is $c_t$, a next value of memory information output by the output layer at time t−1 is $c_{t-1}$, a value of the hidden layer at time t is $h_t$, and the next value of the hidden layer at time t−1 is $h_{t-1}$, where formulas are as follows:

$$\tilde{c}_t = \tanh(W_c \cdot [h_{t-1}, x_t] + b_c)$$

$$c_t = f_t \cdot c_{t-1} + i_t \cdot \tilde{c}_t$$

$$h_t = o_t \cdot \tanh(c_t),$$

in the formula: $\tilde{c}_t$ represents a candidate state of a memory unit at time t; tanh represents a hyperbolic tangent activation function; $W_c$ represents a weight matrix of an input unit; $x_t$ represents the input information; $b_c$ represents a bias term of an input unit state; and · represents element-wise multiplication.

step 3, training the BiLSTM:

subjecting the BiLSTM to network training based on an input data, selecting t time steps as a prediction interval, and using a data before each of the t time steps as an input training data at a current moment; selecting a root mean square error as an error function, calculating a gradient of each weight according to a corresponding error term using an adaptive matrix estimation algorithm as an optimizer when an error is greater than a default threshold, where the error term is propagated in a reverse direction along time and the weight is updated through stochastic gradient descent; conducting gradient evaluation, where if a gradient accuracy meets a stopping criterion, a corresponding value of the gradient accuracy is output as a prediction result; if the gradient accuracy does not meet the stopping criterion, the gradient is re-updated;

Specifically, the adaptive matrix estimation algorithm specifically includes:

(1) randomly initializing all weights in the BILSTM;

(2) setting initial parameters of a first-order moment, a second-order moment, a global learning rate, and an attenuation coefficient;

(3) calculating a current gradient through a loss function;

(4) calculating the time steps;

(5) updating an accumulated gradient with the current gradient to allow first-order moment estimation;

(6) updating a square of the accumulated gradient with the current gradient to allow second-order moment estimation;

(7) subjecting the first-order moment and the second-order moment to deviation correction;

(8) calculating an update amount of the all weights in the BiLSTM through corrected first-order moment and second-order moment;

(9) updating the all weights of parameters in the BILSTM; and

(10) repeating steps (3) to (9) to allow iteration, terminating the iteration when a maximum number of iterations for termination is achieved, and outputting current parameters in the BILSTM.

Specifically, the automatic optimization on the network parameters specifically includes:

generating an initial sample point $X_i$ with an initial learning rate, a number of iterations, and a number of neurons in the hidden layer according to a range of model parameters, inputting the initial sample point $X_i$ into a sparrow search algorithm to allow automatic optimization on network parameters of the BiLSTM including the initial learning rate, the number of iterations, and the number of the neurons in the hidden layer, and then outputting optimal network parameters to obtain a trained and optimized BILSTM; randomly initializing a position of a sparrow population, setting a producer ratio and an optimization dimension, setting a position update mode of a discoverer at different warning values and calculating a fitness value, setting a position update mode of a follower with different fitness values, obtaining a final position as an optimal solution, and outputting the optimal solution to obtain the optimal network parameters to obtain the trained and optimized BiLSTM.

The present disclosure further provides a system for ALT of a PEMFC, As shown in a data acquisition and processing module, an NN construction module, an NN training module, an NN optimization module, and an NN application module; where the data acquisition and processing module is configured to conduct: collecting a voltage-time sequence data of the PEMFC through a sensor to allow Gaussian filtering to filter out noise and abnormal peaks to obtain a processed voltage-time sequence data; subjecting the processed voltage-time sequence data to EMD, such that a voltage data is decomposed to obtain K intrinsic mode functions, where K is an integer of greater than or equal to 1; and dividing the K intrinsic mode functions into a training data set and a test data set according to a ratio of user demand, and normalizing the training data set and normalizing the test data set based on a normalization standard of the training data set to smoothly map into [0,1];

the NN construction module is configured to conduct: constructing a BILSTM, where the BiLSTM includes an input layer, a hidden layer, and an output layer, a number of input eigenvalues of the BiLSTM is determined according to a number of the intrinsic mode functions, and a matrix and a vector of the BILSTM are initialized to 0;

the NN training module is configured to conduct: subjecting the BiLSTM to network training based on an input data, selecting t time steps as a prediction interval, and using a data before each of the t time steps as an input training data at a current moment; selecting a root mean square error as an error function, calculating a gradient of each weight according to a corresponding error term using an adaptive matrix estimation algorithm as an optimizer when an error is greater than a default threshold, where the error term is propagated in a reverse direction along time and the weight is updated through stochastic gradient descent; conducting gradient evaluation, where if a gradient accuracy meets a stopping criterion, a corresponding value of the gradient accuracy is output as a prediction result; if the gradient accuracy does not meet the stopping criterion, the gradient is re-updated;

the NN optimization module is configured to conduct: generating an initial sample point $X_i$ with an initial learning rate, a number of iterations, and a number of neurons in the hidden layer according to a range of model parameters, inputting the initial sample point $X_i$ into a sparrow search algorithm to allow automatic optimization on network parameters of the BILSTM including the initial learning rate, the number of iterations, and the number of the neurons in the hidden layer, and then outputting optimal network parameters to obtain a trained and optimized BiLSTM; inputting the test data set into the trained and optimized BILSTM to allow testing to determine whether a newly selected sample point meets a model accuracy requirement; where if the newly selected sample point meets the model accuracy requirement, the testing is terminated through a termination algorithm to output an optimal BiLSTM; if the newly selected sample point does not meet the model accuracy requirement, whether the automatic optimization reaches a maximum number of iterations is determined; if the automatic optimization reaches the maximum number of iterations, the optimal BiLSTM is output, otherwise the sparrow search algorithm is iterated in a loop until the newly selected sample point meets the model accuracy requirement; and the NN application module is configured to conduct: applying the optimal BILSTM to the ALT of the PEMFC, denormalizing an obtained prediction result, and converting a resulting predicted remaining useful life data into a remaining useful life-time sequence data through the output layer.

The specific content of this system is described in the above method and will not be repeated here.

The present disclosure further provides a computer device for ALT of a PEMFC, including a memory, a processor, and a program instruction stored in the memory to allow execution by the processor, where the processor executes the program instruction to implement the steps of the method and to run the system.

The present disclosure further provides a computer-readable storage medium storing a computer program, where the computer program, when executed by a processor, implements the steps in the method and runs the system.

Example

In the present disclosure, a data set under static and dynamic conditions of over 1,000 h in the 2014 IEEE PHM Data Challenge was used as an implementation data of this example.

The data set came from a 1 kW power PEMFC platform, which had a stack consisting of 5 single cells with an activation area of 100 $cm^2$. The cell had a nominal current density of 0.70 $A/cm^2$ and a maximum current density of 1 $A/cm^2$. A long-term testing of the PEMFC at a constant current of 70 A resulted in a data set under static conditions. At the constant current of 70 A, the current was increased by 7 A of a 5 kHz high-frequency incremental ripple current to allow long-term testing to obtain a data set under dynamic conditions. The static conditions referred to 1,150 h of voltage-time sequence data; while the dynamic conditions referred to 1,020 h of voltage-time sequence data.

Figure 2:
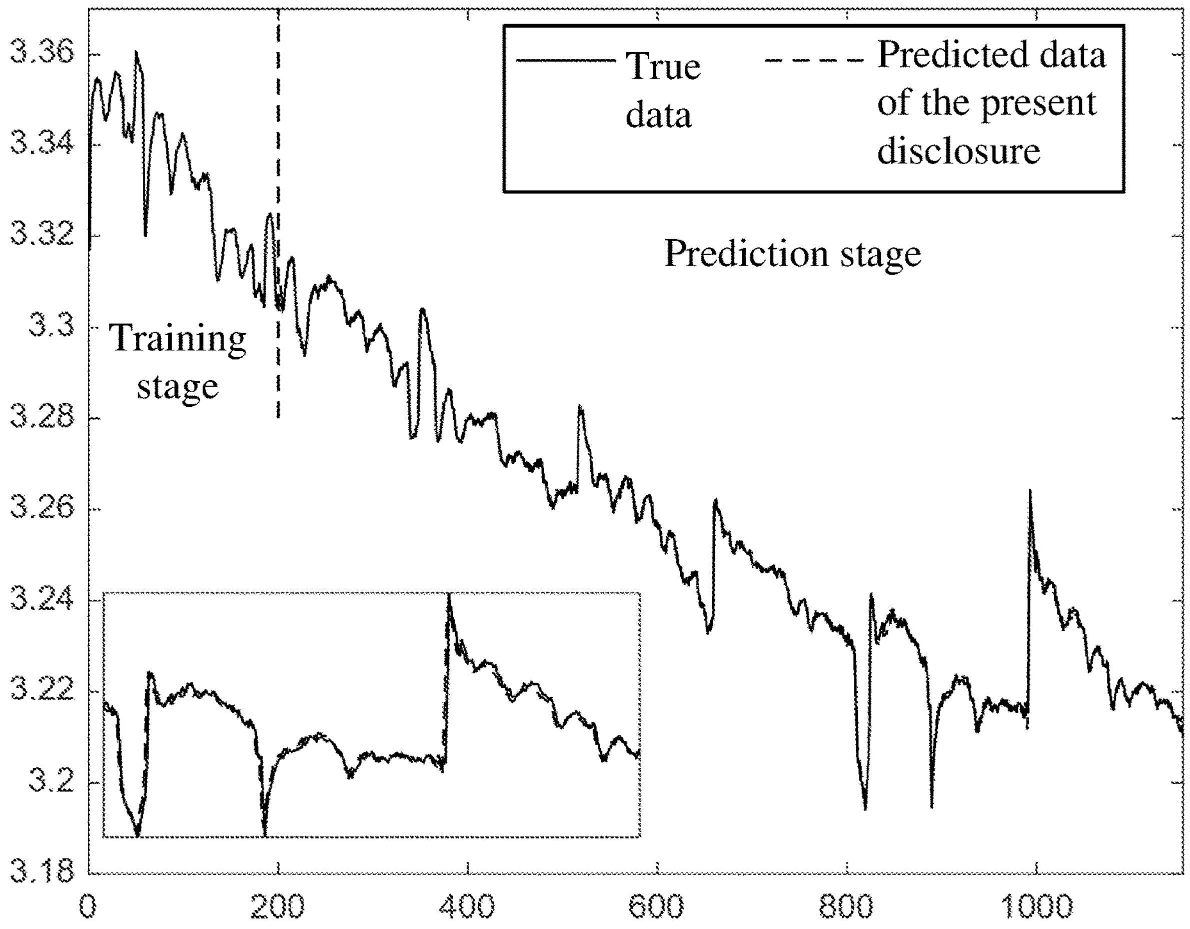
FIG. 2 shows ALT test results of the PEMFC under static conditions.
Figure 3:
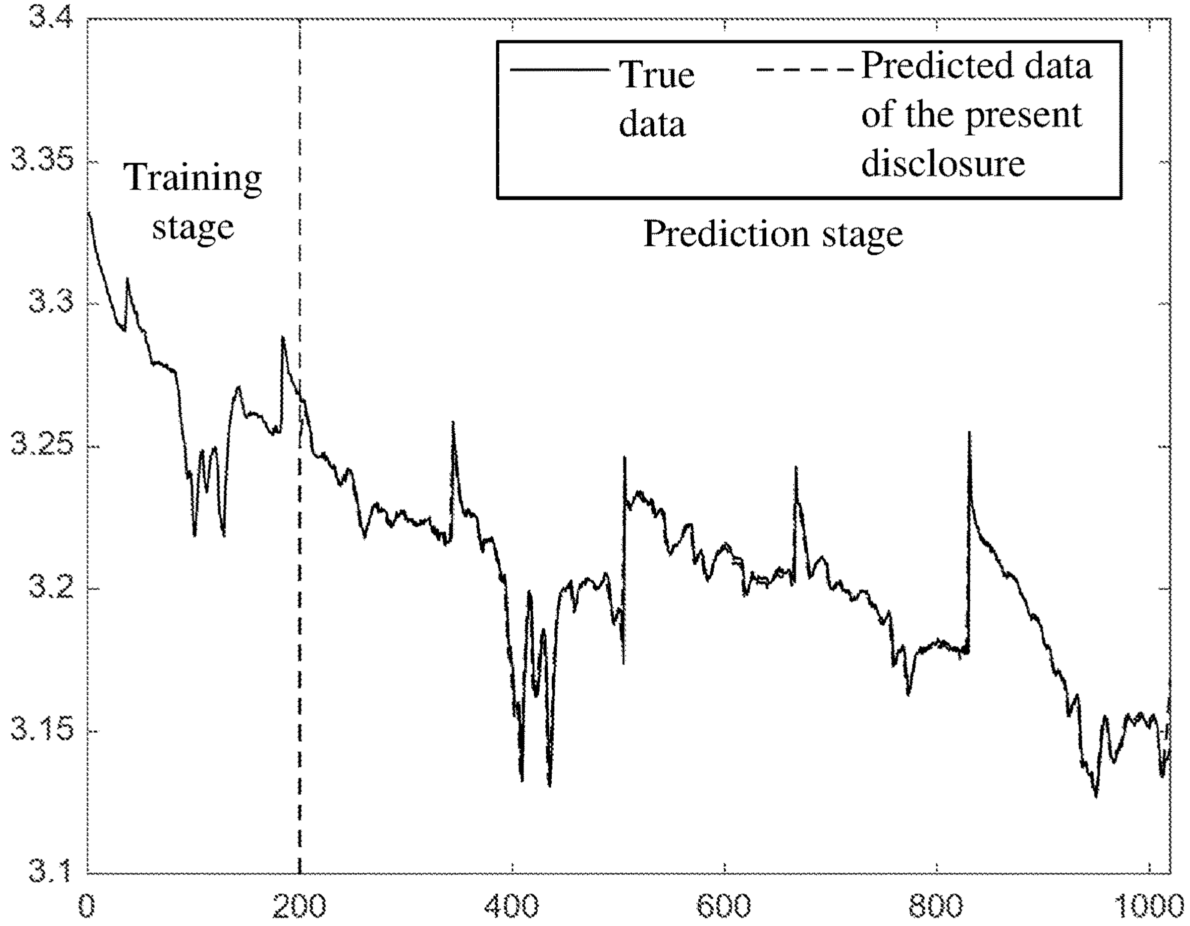
FIG. 3 shows ALT test results of the PEMFC under dynamic conditions.

An example for ALT of PEMFC on IEEE PHM is implemented using the method of the present disclosure. The data of first 200 h under static and dynamic conditions were selected as training data, while the remaining data were selected as test data. A prediction step size of the present disclosure is 12. The voltage-time sequence data of static and dynamic conditions were filtered according to the method in step 1, and the voltage-time sequence data were decomposed into multiple intrinsic mode functions by EMD to increase the input features of a BILSTM. The BiLSTM was constructed and trained according to the methods of steps 2 and 3. The optimal network parameters of the BiLSTM were automatically found using a sparrow search algorithm according to the method in step 4. A prediction result was output by the BiLSTM with the optimal network parameters according to the method of step 5. The prediction results under static and dynamic conditions using the present disclosure were respectively shown in FIG. 2 and FIG. 3.

The prediction curve obtained by executing the method in the present disclosure closely fits the test data. Even if at a prediction step size of 12, there is a small error between the prediction data and the true data. In the present disclosure, the input data of BiLSTM is increased through EMD. The method of the present disclosure adopts low-proportion training data to achieve prediction of long-term remaining useful life, and realizes automatic optimization of network parameters based on different training data. This effectively avoids premature damage of the fuel cell and is of great significance to the daily maintenance of the fuel cell.

Those skilled in the art should understand that the embodiments of this application may be provided as a method, a system, or a computer program product. Therefore, the present application may use full hardware embodiments, full software embodiments, or software and hardware combined embodiments. Moreover, the present disclosure may be in a form of a computer program product that is implemented on one or more computer-usable storage media (including but not limited to a magnetic disk memory, a CD-ROM, an optical memory, and the like) that include computer-usable program code. The solutions in the example of the present application can be implemented using various computer languages, such as the object-oriented programming language Java and the literal scripting language JavaScript.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct a computer or another programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, such that a series of operations and steps are performed on the computer or another programmable device, thereby generating computer-implemented processing. Therefore, the instructions executed on the computer or the programmable device provide steps for implementing a specific function in one or more processes in the flowcharts and/or in one or more blocks in the block diagrams.

Although some preferred embodiments of the present application have been described, those skilled in the art can make changes and modifications to these embodiments once they learn the basic inventive concept. Therefore, the appended claims are intended to be interpreted as including the preferred embodiments and all changes and modifications falling within the scope of this application.

Apparently, a person skilled in the art can make various changes and modifications to this application without departing from the spirit and scope of this application. This application is intended to cover these modifications and variations that they fall within the scope of the claims of the present application and their equivalent technologies.

What is claimed is:

1. A method for accelerated life testing (ALT) of a proton exchange membrane fuel cell (PEMFC), comprising the following steps:

step 1, conducting data collection and processing: collecting a voltage-time sequence data of the PEMFC through a sensor to allow Gaussian filtering to filter out noise and abnormal peaks to obtain a processed voltage-time sequence data; subjecting the processed voltage-time sequence data to empirical mode decomposition (EMD), such that a voltage data is decomposed to obtain K intrinsic mode functions each representing local characteristic signals at different time scales of an original signal, wherein K is an integer of greater than or equal to 1; and dividing the K intrinsic mode functions into a training data set and a test data set according to a ratio of user demand, and normalizing the training data set and normalizing the test data set based on a normalization standard of the training data set to smoothly map into [0,1];

step 2, constructing a bidirectional long short-term memory-based artificial neural network (BiLSTM) to independently predict local characteristic signals in the K intrinsic mode functions, thereby achieving a non-interference effect and reducing a difficulty in predicting the remaining useful life of the PEMFC, wherein the BILSTM comprises an input layer, a hidden layer, and an output layer, a number of input eigenvalues of the BiLSTM is determined according to a number of the intrinsic mode functions, and a matrix and a vector of the BiLSTM are initialized to 0;

step 3, training the BiLSTM: subjecting the BiLSTM to network training based on an input data, selecting t time steps as a prediction interval, and using a data before each of the t time steps as an input training data at a current moment; selecting a root mean square error as an error function, calculating a gradient of each weight according to a corresponding error term using an adaptive matrix estimation algorithm as an optimizer when an error is greater than a default threshold, wherein the error term is propagated in a reverse direction along time and the weight is updated through stochastic gradient descent; conducting gradient evaluation, wherein if a gradient accuracy meets a stopping criterion, a corresponding value of the gradient accuracy is output as a prediction result; if the gradient accuracy does not meet the stopping criterion, the gradient is re-updated; and generating an initial sample point $X_i$ with an initial learning rate, a number of iterations, and a number of neurons in the hidden layer according to a range of model parameters, inputting the initial sample point $X_i$ into a sparrow search algorithm to allow automatic optimization on network parameters of the BiLSTM comprising the initial learning rate, the number of iterations, and the number of the neurons in the hidden layer, and then outputting optimal network parameters to obtain a trained and optimized BiLSTM;

step 4, testing the BiLSTM: inputting the test data set into the trained and optimized BiLSTM to allow testing to determine whether a newly selected sample point meets a model accuracy requirement; wherein if the newly selected sample point meets the model accuracy requirement, the testing is terminated through a termination algorithm to output an optimal BiLSTM; if the newly selected sample point does not meet the model accuracy requirement, whether the automatic optimization reaches a maximum number of iterations is determined; if the automatic optimization reaches the maximum number of iterations, the optimal BiLSTM is output, otherwise the sparrow search algorithm is iterated in a loop until the newly selected sample point meets the model accuracy requirement;

step 5, applying the optimal BiLSTM to the ALT of the PEMFC, denormalizing an obtained prediction result, and converting a resulting predicted remaining useful life data into a remaining useful life-time sequence data through the output layer; and step 6, shutting down the PEMFC system for maintenance before the PEMFC stack is scrapped based on the remaining useful life-time sequence data, thereby preventing premature and permanent damage to the PEMFC.

2. The method for ALT of a PEMFC according to claim 1, wherein the Gaussian filtering in step 1 has a formula as follows:

$$K(t) = \frac{\exp(-t^2/2)}{\sqrt{2\pi}},$$

$$f(t_j) = \sum_{i=1}^{n} s_i \cdot u(t_j) / \sum_{i=1}^{n} s_i,$$

$$s_i = K[(t_j - t_i)]/H,$$

in the formula, K(t) represents standard normal distribution of a parameter data at time t, $f(t_j)$ represents a filtered data, $u(t_j)$ represents the parameter data, n represents a number of the parameter data, and H represents a bandwidth.

3. A computer device for ALT of an PEMFC, comprising a memory, a processor, and a program instruction stored in the memory to allow execution by the processor, wherein the processor executes the program instruction to implement the steps of the method according to claim 2.

4. A computer-readable storage medium storing a computer program, wherein the computer program, when executed by a processor, implements the steps in the method according to claim 2.

5. The method for ALT of a PEMFC according to claim 2, wherein a process of decomposing the voltage data in step 1 specifically comprises: smoothing the voltage data through the EMD; and the EMD is suitable for PEMFC application scenarios with less monitoring data by decomposing the voltage-time sequence data and adding the training data of the BiLSTM to predict the ALT of a long-period PEMFC through a low-proportion training data.

6. A computer device for ALT of an PEMFC, comprising a memory, a processor, and a program instruction stored in the memory to allow execution by the processor, wherein the processor executes the program instruction to implement the steps of the method according to claim 5.

7. A computer-readable storage medium storing a computer program, wherein the computer program, when executed by a processor, implements the steps in the method according to claim 5.

8. The method for ALT of a PEMFC according to claim 5, wherein the input layer in step 2 has a calculation formula as follows:

$$i_t = \sigma(W_i \cdot [h_{t-1}, x_t] + b_i),$$

$$o_t = \sigma(W_o \cdot [h_{t-1}, x_t] + b_o),$$

$$f_t = \sigma(W_f \cdot [h_{t-1}, x_t] + b_f),$$

in the formula: $i_t$, $W_t$, and $b_t$ represent a calculation result, a weight matrix, and a bias term of the input layer, respectively; $O_t$, $W_o$, and $b_o$ represent a calculation result, a weight matrix, and a bias term of the output layer, respectively; $f_t$, $W_f$, and $b_f$ represent a calculation result, a weight matrix, and a bias term of a forget gate, respectively; $h_{t-1}$, represents a next value of the hidden layer at time t−1, $x_t$ represents input information, and $\sigma$ represents a sigmoid activation function; and a value of memory information output by the output layer at time t is $c_t$, a next value of memory information output by the output layer at time t−1 is $c_{t-1}$, a value of the hidden layer at time t is $h_t$, and the next value of the hidden layer at time t−1 is $h_{t-1}$, wherein formulas are as follows:

$$\tilde{c}_t = \tanh(W_c \cdot [h_{t-1}, x_t] + b_c)$$

$$c_t = f_t \cdot c_{t-1} + i_t \cdot \tilde{c}_t$$

$$h_t = o_t \cdot \tanh(c_t),$$

in the formula: $\tilde{c}_t$ represents a candidate state of a memory unit at time t; tanh represents a hyperbolic tangent activation function; $W_c$ represents a weight matrix of an input unit; $x_t$ represents the input information; $b_c$ represents a bias term of an input unit state; and · represents element-wise multiplication.

9. A computer device for ALT of an PEMFC, comprising a memory, a processor, and a program instruction stored in the memory to allow execution by the processor, wherein the processor executes the program instruction to implement the steps of the method according to claim 8.

10. A computer-readable storage medium storing a computer program, wherein the computer program, when executed by a processor, implements the steps in the method according to claim 8.

11. The method for ALT of a PEMFC according to claim 1, wherein the adaptive matrix estimation algorithm in step 3 specifically comprises:

(1) randomly initializing all weights in the BiLSTM;
(2) setting initial parameters of a first-order moment, a second-order moment, a global learning rate, and an attenuation coefficient;
(3) calculating a current gradient through a loss function;
(4) calculating the time steps;
(5) updating an accumulated gradient with the current gradient to allow first-order moment estimation;
(6) updating a square of the accumulated gradient with the current gradient to allow second-order moment estimation;
(7) subjecting the first-order moment and the second-order moment to deviation correction;
(8) calculating an update amount of the all weights in the BiLSTM through corrected first-order moment and second-order moment;
(9) updating the all weights of parameters in the BiLSTM; and
(10) repeating steps (3) to (9) to allow iteration, terminating the iteration when a maximum number of iterations for termination is achieved, and outputting current parameters in the BiLSTM.

12. A computer device for ALT of an PEMFC, comprising a memory, a processor, and a program instruction stored in the memory to allow execution by the processor, wherein the processor executes the program instruction to implement the steps of the method according to claim 11.

13. The method for ALT of a PEMFC according to claim 11, wherein the automatic optimization on the network parameters in step 3 specifically comprises:

randomly initializing a position of a sparrow population, setting a producer ratio and an optimization dimension, setting a position update mode of a discoverer at different warning values and calculating a fitness value, setting a position update mode of a follower with different fitness values, obtaining a final position as an optimal solution, and outputting the optimal solution to obtain the optimal network parameters to obtain the trained and optimized BiLSTM.

14. A computer device for ALT of an PEMFC, comprising a memory, a processor, and a program instruction stored in the memory to allow execution by the processor, wherein the processor executes the program instruction to implement the steps of the method according to claim 13.

15. A computer device for ALT of an PEMFC, comprising a memory, a processor, and a program instruction stored in the memory to allow execution by the processor, wherein the processor executes the program instruction to implement the steps of the method according to claim 1.

16. A computer-readable storage medium storing a computer program, wherein the computer program, when executed by a processor, implements the steps in the method according to claim 1.

17. A system for accelerated life testing (ALT) of a proton exchange membrane fuel cell (PEMFC), comprising a data acquisition and processing module, a neural network (NN) construction module, an NN training module, an NN optimization module, and an NN application module; wherein the data acquisition and processing module is configured to conduct: collecting a voltage-time sequence data of the PEMFC through a sensor to allow Gaussian filtering to filter out noise and abnormal peaks to obtain a processed voltage-time sequence data; subjecting the processed voltage-time sequence data to empirical mode decomposition (EMD), such that a voltage data is decomposed to obtain K intrinsic mode functions each representing local characteristic signals at different time scales of an original signal, wherein K is an integer of greater than or equal to 1; and dividing the K intrinsic mode functions into a training data set and a test data set according to a ratio of user demand, and normalizing the training data set and normalizing the test data set based on a normalization standard of the training data set to smoothly map into [0,1];

the NN construction module is configured to conduct: constructing a bidirectional long short-term memory-based artificial neural network (BiLSTM), wherein the BiLSTM comprises an input layer, a hidden layer, and an output layer, a number of input eigenvalues of the BiLSTM is determined according to a number of the intrinsic mode functions, and a matrix and a vector of the BiLSTM are initialized to 0;

the NN training module is configured to conduct: subjecting the BILSTM to network training based on an input data, selecting t time steps as a prediction interval, and using a data before each of the t time steps as an input training data at a current moment; selecting a root mean square error as an error function, calculating a gradient of each weight according to a corresponding error term using an adaptive matrix estimation algorithm as an optimizer when an error is greater than a default threshold, wherein the error term is propagated in a reverse direction along time and the weight is updated through stochastic gradient descent; conducting gradient evaluation, wherein if a gradient accuracy meets a stopping criterion, a corresponding value of the gradient accuracy is output as a prediction result; if the gradient accuracy does not meet the stopping criterion, the gradient is re-updated;

the NN optimization module is configured to conduct: generating an initial sample point $X_i$ with an initial learning rate, a number of iterations, and a number of neurons in the hidden layer according to a range of model parameters, inputting the initial sample point $X_i$ into a sparrow search algorithm to allow automatic optimization on network parameters of the BiLSTM comprising the initial learning rate, the number of iterations, and the number of the neurons in the hidden layer, and then outputting optimal network parameters to obtain a trained and optimized BiLSTM; inputting the test data set into the trained and optimized BiLSTM to allow testing to determine whether a newly selected sample point meets a model accuracy requirement; wherein if the newly selected sample point meets the model accuracy requirement, the testing is terminated through a termination algorithm to output an optimal BiLSTM; if the newly selected sample point does not meet the model accuracy requirement, whether the automatic optimization reaches a maximum number of iterations is determined; if the automatic optimization reaches the maximum number of iterations, the optimal BiLSTM is output, otherwise the sparrow search algorithm is iterated in a loop until the newly selected sample point meets the model accuracy requirement; and the NN application module is configured to conduct: applying the optimal BiLSTM to the ALT of the PEMFC, denormalizing an obtained prediction result, converting a resulting predicted remaining useful life data into a remaining useful life-time sequence data through the output layer, and shutting down the PEMFC system for maintenance before the PEMFC stack is scrapped based on the remaining useful life-time sequence data, thereby minimizing maintenance time and extending safe useful life while preventing premature and permanent damage to the PEMFC.

18. The system for ALT of a PEMFC according to claim 17, wherein the input layer in the BiLSTM has a calculation formula as follows:

$$i_t = \sigma(W_i \cdot [h_{t-1}, x_t] + b_i),$$
$$o_t = \sigma(W_o \cdot [h_{t-1}, x_t] + b_o),$$
$$f_t = \sigma(W_f \cdot [h_{t-1}, x_t] + b_f),$$

in the formula: $i_t$, $W_t$, and $b_t$ represent a calculation result, a weight matrix, and a bias term of the input layer, respectively; $O_t$, $W_o$, and $b_o$ represent a calculation result, a weight matrix, and a bias term of the output layer, respectively; $f_t$, $W_f$, and $b_f$ represent a calculation result, a weight matrix, and a bias term of a forget gate, respectively; $h_{t-1}$ represents a next value of the hidden layer at time t−1, $x_t$ represents input information, and $\sigma$ represents a sigmoid activation function; and a value of memory information output by the output layer at time t is $c_t$, a next value of memory information output by the output layer at time t−1 is $c_{t-1}$, a value of the hidden layer at time t is $h_t$, and the next value of the hidden layer at time t−1 is $h_{t-1}$, wherein formulas are as follows:

$$\tilde{c}_t = \tanh(W_c \cdot [h_{t-1}, x_t] + b_c)$$
$$c_t = f_t \cdot c_{t-1} + i_t \cdot \tilde{c}_t$$
$$h_t = o_t \cdot \tanh(c_t),$$

in the formula: $\tilde{c}_t$ represents a candidate state of a memory unit at time t; tanh represents a hyperbolic tangent activation function; $W_c$ represents a weight matrix of an input unit; $x_t$ represents the input information; $b_c$ represents a bias term of an input unit state; and · represents element-wise multiplication.

19. A computer device for ALT of an PEMFC, comprising a memory, a processor, and a program instruction stored in the memory to allow execution by the processor, wherein the processor executes the program instruction to runs the system according to claim 18.

20. A computer device for ALT of an PEMFC, comprising a memory, a processor, and a program instruction stored in the memory to allow execution by the processor, wherein the processor executes the program instruction to runs the system according to claim 17.

* * * * *